United States Patent [19]
Davis

[11] 3,975,288

[45] Aug. 17, 1976

[54] HIGH TEMPERATURE NON-CRYSTALLIZING CHOLESTERIC LIQUID CRYSTAL COMPOSITIONS

[75] Inventor: Frederick Davis, Dublin, Calif.

[73] Assignee: RPR, Inc., Dublin, Calif.

[22] Filed: Jan. 2, 1975

[21] Appl. No.: 537,882

[52] U.S. Cl............... 252/299; 23/230 LC; 73/356; 252/408; 350/160 LC; 428/1
[51] Int. Cl.² ............... C09K 3/34; C07C 97/24; C09B 1/50
[58] Field of Search .......... 252/299, 408 LC; 428/1; 20/230 LC; 73/356; 350/160 LC

[56] References Cited
UNITED STATES PATENTS

| | | | |
|---|---|---|---|
| 3,409,404 | 11/1968 | Fergason | 252/299 |
| 3,441,513 | 4/1969 | Woodmansee | 252/299 |
| 3,580,864 | 5/1971 | Goldberg et al. | 252/299 |
| 3,580,865 | 5/1971 | Goldberg | 252/299 |
| 3,585,381 | 6/1971 | Hodson et al. | 252/299 |
| 3,619,254 | 11/1971 | Davis | 252/299 |
| 3,620,889 | 11/1971 | Baltzer | 252/299 |
| 3,697,297 | 10/1972 | Churchill et al. | 252/299 |
| 3,720,623 | 3/1973 | Cartmell et al. | 252/299 |
| 3,920,574 | 11/1975 | Brown, Jr. et al. | 252/299 |

OTHER PUBLICATIONS

Gray, G. W.; Molecular Structure and Properties of Liquid Crystals, Academic Press, N. Y., pp. 188–196, (1962).

*Primary Examiner*—Benjamin R. Padgett
*Assistant Examiner*—T. S. Gron
*Attorney, Agent, or Firm*—Townsend and Townsend

[57] ABSTRACT

High temperature non-crystallizing cholesteric liquid crystal compositions are provided having at least about 50 weight percent of cholesteryl 3-chloropropionate, at least about 30 weight percent of a cholesteryl ester, wherein the acyl group has a substituted or unsubstituted benzene ring, and not more than 20 weight percent of other cholesteryl compounds. The compositions are found to provide billiant colors and do not crystallize when stored for long periods of time at room temperature or below.

8 Claims, No Drawings

HIGH TEMPERATURE NON-CRYSTALLIZING CHOLESTERIC LIQUID CRYSTAL COMPOSITIONS

BACKGROUND OF THE INVENTION

Field of the Invention

Cholesteric liquid crystals find a wide variety of applications based on their ability to scatter light selectively through a specific temperature range. The liquid crystals normally go from a liquid transparent phase through a mesophase, where light is selectively scattered and color changes occur with increasing temperature, and then back to a transparent liquid phase.

For liquid crystal compositions which have mesophases substantially above ambient temperatures, the compositions are frequently crystalline at ambient temperatures. Liquid crystal compositions with elevated mesophase ranges, which are crystalline at ambient temperatures have a number of undesirable properties.

When a film of a liquid crystal composition crystallizes, the film appears mottled and pockmarked rather than having a smooth uniform texture. In addition, it is found that the temperature at which the liquid crystal composition begins the mesophase with increasing temperature is different from the temperature at which the liquid crystal composition leaves the mesophase on decreasing the temperature. That is, one obtains a different temperature range for the mesophase depending upon whether one is heating the sample from below the mesophase or cooling the sample from above the mesophase temperature range.

In many elevated temperature applications for cholesteric liquid crystals, one is concerned about the appearance of the film. Also, in order to have reproducibility, it is desirable that the color change for the cholesteric liquid crystal composition relate to the same temperature range, irrespective of whether one is cooling or heating the sample. It is therefore desirable to have cholesteric liquid crystals which provide mesophase ranges substantially above ambient temperatures, but do not crystallize at ambient temperatures when standing over long periods of time.

Brief Description of the Prior Art

U.S. Pat. No. 3,441,513 discloses various cholesteric liquid crystal compositions containing cholesteryl oleate, cholesteryl esters of fatty acids or nitrobenzoic acid, and cholesteryl esters of short chain aliphatic carboxylic acids. U.S. Pat. No. 3,529,156 discloses cholesteric liquid crystal compositions containing a cholesteryl halide and cholesteryl fatty alcohol carbonate esters. U.S. Pat. No. 3,580,864 discloses cholesteryl erucyl carbonate as an additive to cholesteric liquid crystal compositions for stabilization against solid formation.

SUMMARY OF THE INVENTION

Novel liquid crystal compositions are provided, which do not crystallize upon standing at ambient temperatures for long periods of time, comprising at least about 50 weight percent of cholesteryl 3-chloropropionate, at least about 30 weight percent of a cholesteryl ester of a carboxylic acid having an aromatic ring, and not more than about 20 weight percent of another cholesteryl ester or halide. These compositions are found to have mesophase temperature ranges substantially above ambient temperatures and provide excellent color spectrums when passing through the mesophase range. Furthermore, the mesophase temperature range is substantially constant whether heating the mixture from below the mesophase temperature range or cooling the mixture from above the mesophase temperature range.

DESCRIPTION OF THE SPECIFIC EMBODIMENTS

Novel cholesteric liquid crystal compositions are provided having mesophase temperature ranges substantially above ambient temperatures (greater than 20°C). The compositions are stable for long periods of time, can be applied as films to a wide variety of surfaces in a wide variety of conventional ways, and remain stable without crystallizing for long periods of time. As a result, the films formed with the subject liquid crystal compositions remain smooth, uniform, and unblemished. In addition, the subject compositions provide a bright variegated appearance in the mesophase range, so as to be useful in allowing for temperature measurement while providing an aesthetically pleasing display.

The liquid crystal compositions will have as their cholesteric components at least about 50 percent and not more than about 95 percent by weight, more usually from about 50 to 90 percent by weight of cholesteryl or cholestanyl 3-chloropropionate. While for the most part the cholesteryl compounds will be employed, cholestanyl compounds can be substituted for the cholesteryl compounds.

The cholesteric liquid crystal compositions' components will come within the following formula:

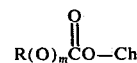

wherein:
Ch has the following formula:

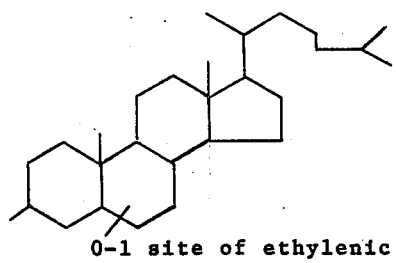

0–1 site of ethylenic unsaturation the cholestanyl or cholesteryl ring being bonded at the 3 position;
$m$ is 0 or 1, usually 0; and
R is an organic radical which is the residue of an acyl group or alcohol or phenol.

In addition to the 3-chloropropionate ester, one or more cholesteryl esters will be employed where the acyl functionality has an aromatic ring, normally a benzene ring, which may be substituted or unsubstituted. Preferably, the ring will be substituted with electron withdrawing groups (electronegative groups), those having sigma$_m$ values of greater than 0.05, preferably from about 0.1 to 0.8.

These compounds will for the most part have the following formula:

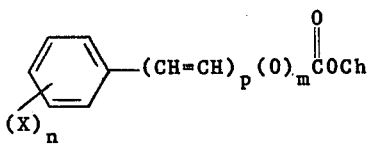

wherein:
Ch and $m$ have been defined previously;
$p$ is 0 or 1, usually 0, with $m + p = 1$;
$n$ is 0 to 3, usually 0 to 2, and preferably 1 to 2; and
X is alkyl of from 1 to 12 carbon atoms, more usually alkyl of from 6 to 12 carbon atoms; oxo-carbonyl of from 1 to 6 carbon atoms, more usually of from 2 to 4 carbon atoms, e.g. acetyl, propionyl, etc.; cyano, nitro, halo, particularly of atomic number 9 to 35, e.g. fluoro, chloro and bromo, non-oxo-carbonyl of from 1 to 12 carbon atoms, more usually of from 1 to 6 carbon atoms, including the parent carboxy acid, esters and amides; thiooxy derivatives of from 1 to 6 carbon atoms, e.g. methyl sulfonyl; oxy, e.g. ethoxy, and the like. Preferably the substituents will be in meta and/or para positions.

The ester having the benzene ring will normally be present in at least 5 weight percent and not exceed 50 weight percent, more usually being from about 10 to 50 weight percent. The total of the benzene ring containing ester and 3-chloropropionate ester will generally be at least 70 weight percent, more usually at least 80 weight percent.

Illustrative esters include cholesteryl cinammate, cholesteryl m-nitrobenzoate, cholesteryl p-cyanobenzoate, cholesteryl 2,4-difluorobenzoate, cholesteryl p-bromobenzoate, cholesteryl toluate, cholesteryl anisate, para-ethylsulfonylbenzoate, cholesteryl terphthalate monoamide, and cholesteryl para-butyrylbenzoate.

Generally, the benzene ring containing esters will have from 1 to 3 substituents, usually 1 to 2, and preferably only one substituent.

From about 0 to 20 weight percent of the composition may be a cholesteryl ester which does not come within the definition of the other two components. These esters will normally be aliphatic esters having from 0 to 1 site of ethylenic unsaturation, otherwise saturated, and of from 1 to 18 carbon atoms, more usually of from 2 to 18 carbon atoms, and will either be the carboxyacyl ester or carbonate ester where the aliphatic group is derived from an alcohol.

This third component will generally have the following formula:

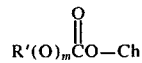

wherein:
Ch and $m$ have been defined previously; and
R′ is an aliphatic group having from 0 to 1 site of ethylenic unsaturation, normally saturated, which may be branched chain or straight chain, frequently straight chain, and is of from 1 to 18 carbon atoms, more usually of from 2 to 18 carbon atoms, and preferably of from about 6 to 16 carbon atoms.

Where aromatic esters are employed which are unsubstituted on the benzene ring or do not have an electron withdrawing substituent, usually they will be used in amounts of not greater than about 25 weight percent and, generally, solely with the 3-chloropropionate ester. These compositions will therefore have from about 75 to 95 weight percent of the 3-chloropropionate and from about 5 to 25 weight percent of the aromatic ester.

The compositions of this invention are readily prepared by mixing the components together until the composition is substantially homogeneous. The compositions may be formulated in a wide variety of ways in accordance with conventional techniques for preparing liquid crystal films. The subject compositions can be employed neat, can be encapsulated in accordance with the technique described in U.S. Pat. No. 3,585,381, or dispersed in polymeric matrixes such as described in U.S. Pat. No. 3,619,254, and as described in copending application Ser. No. 425,006, filed Dec. 17, 1973, or the like. The liquid crystal compositions when employed with a binder matrix will generally be present in from about 5 to 90, usually from about 20 to 70 weight percent of the solids in the film.

A number of compositions were prepared, heated and their mesophase range determined, and then allowed to cool to determine whether the compositions crystallized. In most instances, this process was repeated to determine the effect of repeated heating and cooling. Furthermore, the compositions were allowed to stand for long periods of time; in many instances, in excess of six months, to determine whether crystallization would occur. The following table indicates the results reporting the weight percent of the compositions, the mesophase range, and whether crystallization occurred.

| WEIGHT PERCENT OF CHOLESTERYL ESTERS | | | | | | | | | |
|---|---|---|---|---|---|---|---|---|---|
| Acyl Groups | | | | | | | | Mesophase | |
| 3-Cl propionate | 3,5-dinitro-benzoate | 3,4-diCl benzoate | p-nitro-benzoate | cinnamate | nonylphenyl-carbonate | 2,4-diCl benzoate | p-n-butoxy-phenyl carbonate | non-anoate | Temp Range °C | Crystallization |
| 90 | 10 | | | | | | | | 80–110 | No |
| 80 | 20 | | | | | | | | 91–120 | No |
| 70 | 30 | | | | | | | | 104–124 | No |
| 90 | | 10 | | | | | | | 56–94 | No |
| 80 | | 20 | | | | | | | 52–96 | No |
| 70 | | 30 | | | | | | | 48–98 | No |

-continued
WEIGHT PERCENT OF CHOLESTERYL ESTERS

| | | | Acyl Groups | | | | | | | |
|---|---|---|---|---|---|---|---|---|---|---|
| 3-Cl propionate | 3,5-dinitro-benzoate | 3,4-diCl benzoate | p-nitro-benzoate | cinnamate | nonylphenyl-carbonate | 2,4-diCl benzoate | p-n-butoxy-phenyl carbonate | non-anoate | Mesophase Temp Range °C | Crystall-ization |
| 90 | | | 10 | | | | | | 62–124 | No |
| 80 | | | 20 | | | | | | 63–129 | No |
| 70 | | | 30 | | | | | | 65–133 | No |
| 90 | | | | 10 | | | | | 55–110 | No |
| 80 | | | | 20 | | | | | 48–109 | Yes |
| 70 | | | | 30 | | | | | 40–118 | No |
| 90 | | | | | 10 | | | | 53–105 | No |
| 80 | | | | | 20 | | | | 37–90 | No |
| 70 | | | | | 30 | | | | <20–80 | Yes |
| 90 | | | | | | 10 | | | 54–125 | No |
| 80 | | | | | | 20 | | | 44–128 | No |
| 70 | | | | | | 30 | | | 38–134 | Some |
| 60 | 40 | | | | | | | | 100–130 | No |
| 50 | 50 | | | | | | | | 104–120 | No |
| 60 | 60 | | | | | | | | 110–127 | Yes |
| 60 | | | | 40 | | | | | 34–116 | No |
| 80 | 10 | | | 10 | | | | | 65–128 | No |
| 50 | 10 | | | 40 | | | | | 46–135 | No |
| 20 | 10 | | | 70 | | | | | 65–170 | No |
| 48 | 20 | | | | | | 12 | 20 | 25–114 | No |
| 54 | 20 | | | | | | 6 | 20 | 41–115 | No |
| 60 | 20 | | | | | | | 20 | 63–116 | No |
| 72 | 20 | | | | | | 8 | | 62–125 | No |

It is evident from the above results that a wide variety of compositions can be prepared employing cholesteryl 3-chloropropionate and cholesteryl aryl esters to obtain compositions which provide broad mesophase temperature ranges which extend above 100°C, and which do not crystallize upon standing. Thus, one can prepare cholesteric liquid crystal displays for relating temperatures substantially above ambient temperatures, which retain their original appearance for long periods of time, while accurately repeating the same color display through the same temperature range.

As indicated, the composition of the invention can be employed as temperature indicators. As such there will normally be a layer of from about 0.5 to 20, usually 1 to 12mils thickness of the liquid crystal composition, by itself, or in combination with from about 5 to 60 weight percent of a polymeric binder. The liquid crystal composition will be protected by a thin inert transparent film of from about 1 to 10mils in thickness on one side and have a black backing of from about 0.5 to 20mils on the other side, depending on the nature of the backing. Where the black backing is formed from a black ink or paint, it will normally be of from about 0.5 to 5mils.

The laminate of the transparent sheet, liquid crystal film and black polymeric backing may be bonded to a wide variety of additional films. Bonded to the black backing may be a releasable adhesive and protective film, a heat transfer film, such as aluminum, a metal sheet or rod, a solid plastic or metal support, or the like.

Although the foregoing invention has been described in some detail by way of illustration and example for purposes of clarity of understanding, it will be obvious that certain changes and modifications may be practiced within the scope of the appended claims.

I claim:

1. A composition comprising an elevated temperature cholesteric liquid crystal composition consisting essentially of:
   at least about 50 weight percent of the 3-chloropropionate ester of Ch;
   at least about 5 weight percent of an ester of Ch having the formula

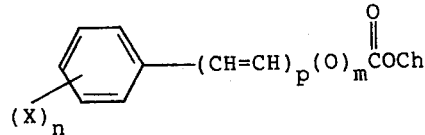

wherein:
   $m$ is 0 or 1;
   $p$ is 0 or 1;
   $p + m = 1$;
   $n$ is 0 to 3; and
   X is selected from the group consisting of an alkyl radical having from 1 to 12 carbon atoms, a thiooxy radical having from 1 to 6 carbon atoms, an oxo-carbonyl radical having from 1 to 6 carbon atoms, a non-oxo-carbonyl radical having from 1 to 12 carbon atoms, an alkoxy radical, an halo radical, a cyano radical, and a nitro radical;
   and from 0 to 20 weight percent of an aliphatic ester of Ch; wherein Ch is $O^3$-cholestanyl or -cholesteryl.

2. A composition in accordance with claim 1 wherein $n$ is 1 to 2 and X is selected from the group consisting of an alkyl radical having from 6 to 12 carbon atoms, an alkoxy radical, an halo radical of atomic number 9 to 35 and a nitro radical and is in the meta and/or para positions.

3. A composition in accordance with claim 1 wherein said 3-chloropropionate ester of Ch is from about 50–95 weight percent of the composition and said ester of Ch having the formula shown is about 5–50 weight percent of the composition.

4. A composition in accordance with claim 1 wherein said ester of Ch having the formula shown is a dichlorobenzoate.

5. A composition in accordance with claim 1 wherein said ester of Ch having the formula shown is a dinitrobenzoate.

6. A composition in accordance with claim 1 wherein said ester of Ch having the formula shown is a cinnamate.

7. In a laminate having a top inert transparent film, an intermediate film comprising a liquid crystal composition, and a black backing, the improvement wherein said liquid crystal composition is in accordance with claim 1.

8. The improved laminate in accordance with claim 7 wherein said intermediate film comprises about 5–60 weight percent of a polymeric binder based on the liquid crystal composition.

* * * * *